United States Patent
Yoffe et al.

(10) Patent No.: US 11,874,973 B2
(45) Date of Patent: Jan. 16, 2024

(54) COMPUTER MOUSE WITH BOTTOM SURFACE RESISTANCE POINT FOR PRECISION MOVEMENTS

(71) Applicants: Simon Yoffe, Manhattan, NY (US); David Yoffe, Modiin (IL)

(72) Inventors: Simon Yoffe, Manhattan, NY (US); David Yoffe, Modiin (IL)

(73) Assignees: Simon Yoffe; David Yoffe, Modiin (IL)

( * ) Notice: Subject to any disclaimer, the term of this patent is extended or adjusted under 35 U.S.C. 154(b) by 78 days.

(21) Appl. No.: 17/746,297

(22) Filed: May 17, 2022

(65) Prior Publication Data

US 2022/0404919 A1    Dec. 22, 2022

Related U.S. Application Data

(60) Provisional application No. 63/212,639, filed on Jun. 19, 2021.

(51) Int. Cl.
*G06F 3/0354* (2013.01)
*G06F 3/039* (2013.01)

(52) U.S. Cl.
CPC ........ *G06F 3/03543* (2013.01); *G06F 3/0395* (2013.01)

(58) Field of Classification Search
CPC ............................ G06F 3/03543; G06F 3/0395
USPC ......................................................... 345/163
See application file for complete search history.

(56) References Cited

U.S. PATENT DOCUMENTS

| | | | | |
|---|---|---|---|---|
| 5,508,084 A | * | 4/1996 | Reeves ................. | B32B 27/365 |
| | | | | 428/156 |
| 2008/0238879 A1 | * | 10/2008 | Jaeger ................... | G06F 3/0338 |
| | | | | 345/173 |
| 2012/0139841 A1 | * | 6/2012 | Taylor ................. | G06F 3/03543 |
| | | | | 345/168 |
| 2013/0194183 A1 | * | 8/2013 | Odgers ................... | G06F 1/162 |
| | | | | 345/158 |
| 2016/0313816 A1 | * | 10/2016 | Krishnakumar ...... | G06F 3/0338 |
| 2019/0155477 A1 | * | 5/2019 | Busby ................. | G06F 3/03543 |
| 2020/0117898 A1 | * | 4/2020 | Tian ....................... | B25J 13/025 |

* cited by examiner

*Primary Examiner* — Mark Edwards

(57) ABSTRACT

A computer mouse including a base with bottom surface for sliding across a work surface, with a retrievable tip for providing a resistance point for precision movements. At retrieved position, the tip is not touching the work surface, providing regular mouse movement. At working position, the tip is touching the work surface and creating resistance for precise movement of the mouse over the work surface. In some embodiments, computer mouse operated with tip in braked position allows the user to make rotational movements/gestures that can be registered by computer program to invoke actions. This new type of gesture is especially important for people with disabilities that have difficulties with existing gesture like clicking button. In some embodiments, computer mouse operated with tip in braked position allows users with hand tremor to improve cursor positioning by stopping cursor in vicinity of target, then reaching target by rotational movement.

20 Claims, 5 Drawing Sheets

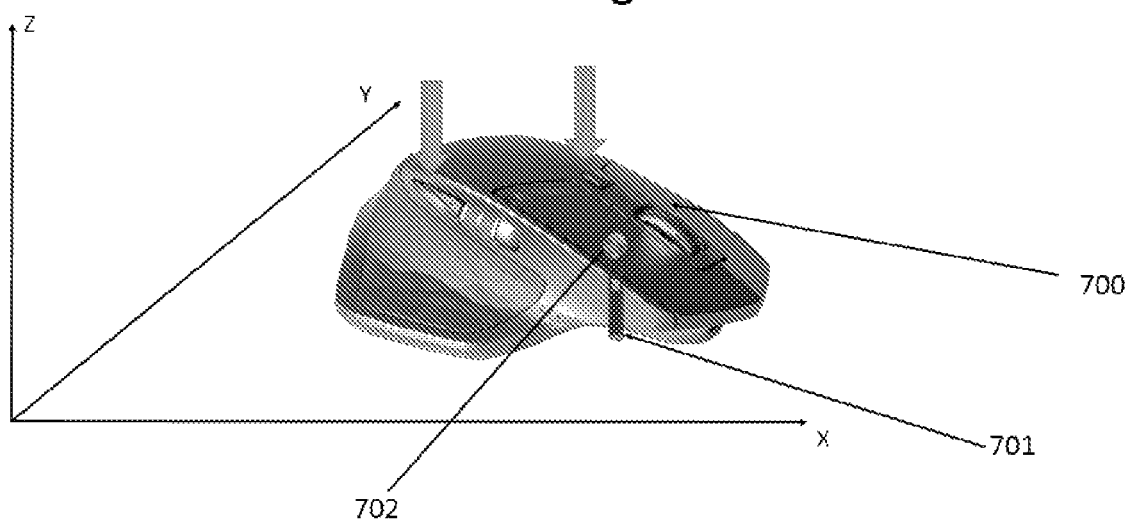

COMPUTER MOUSE WITH BOTTOM SURFACE RESISTANCE POINT FOR PRECISION MOVEMENTS

BACKGROUND OF THE INVENTION

For many computer users the conventional mouse is not good enough for tasks that require precision movements. Tasks like electronic signature, drawing with graphical editors or computer aided design programs; some games require switching between tasks that require different level of precision. Conventional mouse is designed for good sliding over the surface with small effort, different improvements were done for convenient holding in hand and ergonomic use.

Computer mouse pads improved mouse movements, but no improvements can reach level of precision that humans can reach with simple pen. Pen-mouse system, U.S. Pat. No. 7,242,387 was invented, it is more precise, but not ergonomic for user, that is getting tired fast and less convenient for other tasks that do not require the extra level of precision. One of reasons for precise movement of pen in human hand is the resistance point over the work surface that it creates. Ergonomic computer mouse, U.S. Pat. No. 6,396,479 allow the little finger of user to drag on the work surface to assist in fine positioning but does not solve the problem completely. Proposed invention has a retrievable tip, which creates surface resistance point that is needed for precise positioning of the mouse, without losing ergonomic features.

In some embodiments, the tip is moved to working position by rod shaft, penetrating the base, which also have braking function based on penetration length, which is different from U.S. Pat. No. 6,362,811 where braking is done with little finger. And different from U.S. Pat. No. 8,223,124 where shaft does not have tip and used for different purpose.

In some embodiments, mouse is used with additional flat mouse pad, that have pattern of cavities or projections e.g. in form of grid or circle.

In some embodiments, mouse is used with a pad having cavities in grid pattern which together with the tip in working position creates a snap to grid like feature, which is different from Mouse pad, U.S. Pat. No. 6,187,398 that has one cavity.

Outward movement have different resistance from inward movement, where hand placed on table is proving resistance. Balancing the resistance is expected to be more convenient for some users and can be achieved by controlling the tip movement.

Prior Art

Computer mouse, U.S. Patent Application No. 20210018993
Ergonomic computer mouse, U.S. Pat. No. 6,396,479
Computer mouse, U.S. Pat. No. 8,223,124,
Pen-mouse system, U.S. Pat. No. 7,242,387
Ball-point pen U.S. Pat. No. 5,655,847
Tactile mouse, U.S. Pat. No. 7,136,045
Scroll wheel device for computer mouse, U.S. Patent Application No. 20090033640
Thumb-little-finger controlled computer mouse, U.S. Pat. No. 6,266,047.
Family mouse, U.S. Pat. No. 6,348,912.
Computer mouse, U.S. Pat. No. 8,314,772.
Mouse pad, U.S. Pat. No. 6,187,398.
Ergonomic computer mouse, U.S. Pat. No. 6,362,811.
Foot operated computer mouse control device, U.S. Patent Application 20040090419.
Feedback mouse, U.S. Pat. No. 4,868,549.
Scroll wheel device for a computer mouse having a breaking mechanism, U.S. Pat. No. 8,044,935.
Tactile mouse device, U.S. Pat. No. 6,211,861.
Low-cost haptic mouse implementations, U.S. Pat. No. 6,717,573.
Mouse interface device and method for providing enhanced cursor control, European Patent Application EP2259166.
Mouse interface for providing force feedback, U.S. Pat. No. 6,191,774.
Sterilizable optical mouse, U.S. Pat. No. 10,318,021.
MOUSE, U.S. Patent Application No. 20170308188.
Stylus mouse, U.S. Pat. No. 4,550,316.
A Novel Surface Texture Shape for Directional Friction Control, by Ping Lu et al., Article in Tribology Letters February 2018.
Mouse pointer controlling apparatus and method, U.S. Patent Application No. 20060033705.
Multi-function foot controller with mouse and improved shortcut command, U.S. Pat. No. 10,222,874.

SUMMARY OF THE INVENTION

A computer mouse including a base with bottom surface for sliding across a work surface, with a retrievable tip for providing one or more resistance points for precision movements.

At retrieved position, the tip is not touching work surface, proving regular mouse movement. At working position, the tip is touching work surface and creating resistance for precise movement of the mouse over the work surface.

User may switch between retrieved and working positions preemptively or during mouse movement.

In some embodiments, the tip is moved to working position by rod shaft, penetrating the base. Button for switching between retrieved and working positions may be located on the side of mouse next to thumb or little finger. Increased penetration length of the tip will create braking function.

The switching mechanism may have a lock for holding rod at specific penetration length.

In different modifications of the mouse, the button locking mechanism is located under thumb, locks simultaneously the rod, and left (click) mouse button. This feature can be used for editors like Word when text painting is needed.

Electrical actuator instead of finger force can do rod movement.

In different modifications of the mouse, the rod movement can be programed to be triggered when mouse is moved forward, backward, sideward or to other direction according to user pre-selection. When movement in selected direction identified, a signal is sent to the actuator, which then will move rod to desired working position.

Moving rod with tip out of base to the braked position by electrical actuator will create braking effect to mouse movement. This action can be initiated by user, which is pressing initiation button or by program, which applied braking on deceleration part of path. When long path was identified by high initial speed and moving rod was in working position toward virtual object (possible target), rod is retrieved from working position for acceleration and constant speed part of path, and then moved in braked position on deceleration part of path.

Program based on initial speed, initial acceleration, and direction during movement and available targets on computer screen, predicting virtual objects (target or group of targets) and initiating braking. When single virtual objects cannot be distinguished out of group of virtual objects, braking applied at the part of path common to group and released reaching vicinity of virtual objects.

In different modifications of the mouse, the steering axle of the rod shaft can be at different angles to the base. The angle is generally between 30 and 90 degrees, depending on user convenience. Since majority of people are used to hold a pen at certain angle, expected that user who is accustomed to hold writing pen at low angle will prefer mouse with movable rod at the similar angle.

In different modifications of the mouse, the base includes a wheel with multiple tips at fixed positions where the user can choose the desired tip by rotating the wheel to the appropriate fixed position.

In different modifications of the mouse, an additional flat mouse pad with cavities in form of grid is provided, which together with the tip creates a snap to grid like feature.

Tips can be done in different shapes, using different materials. Typically, metal ball is used for tip. For glass, plywood surfaces instead of ball edge, other shapes may be used and or other materials with higher friction capability like rubber. Tip profile and form can create different resistance in different direction of movement.

Movement detection sensor baseplate can be lowered in order to keep same distance between sensor and bottom surface in different embodiment when tip is moved to working position.

For example, in modifications using bottom wheel, where baseplate in pressed against backside of wheel, that have cavity correspondent to tip length on other side of wheel if wheel is turned to working position back plated is lowered since it is pressed against cavity.

Computer mouse with tip in working position allows the user to make rotational movements/gestures around axis provided by tip. Computer program registering rotational movements/gestures and invoking actions on user behalf. For example, adjusting volume/brightness, changing selected/focused item, etc.

Computer mouse with tip in working position allows the user to make pressure gestures on the tip. Computer program registering pressure gestures and invoking actions on user behalf. For example, clicking at cursor position, changing selection radius based on pressure strength, etc.

These types of gestures can be alternative for traditional mouse-based gestures e.g. clicking/wheel spinning, and provide additional flexibility or alternatives especially important for users with disabilities.

In different modifications of the mouse, for activating special command by computer mouse, user is making rotational movement of mouse, when mouse is rotated over mouse pad with pattern of cavities or projections.

Computer mouse with tip in braked position allows users that have hand tremor to improve cursor positioning by stopping cursor in vicinity of target, then reaching target by rotational movement. User is moving computer mouse in direction of virtual target, when cursor is in vicinity of virtual target user is stopping mouse by activating rod mechanism that moving tip in to braked position, then user is reaching exact position by rotational movement of mouse.

Projections at mouse pad while projection height is changing from maximum to zero in certain direction are creating directional resistance, enabling additional accuracy and or identifying rotational movement.

Computer mouse is placed on the sloped surface, tip in working position prevents sliding from place that it was left.

While the invention has been described with respect to a limited number of embodiments, it will be appreciated that many variations, modifications, and other applications disclosed herein may be made. Those skilled in the art will appreciate that other forms and ways can embody the invention, without losing the scope disclosed herein. The embodiments described herein should be considered as illustrative and not restrictive.

BRIEF DESCRIPTION OF THE DRAWINGS

Reference will be made in detail to preferred embodiments disclosed herein, examples of which may be illustrated in the accompanying figures. The figures are intended to be illustrative, not limiting.

FIG. 7 is example of mouse pressure gesture.

DETAILED DESCRIPTION OF THE DRAWINGS

Computer mouse is a hand-held pointing device that detects motion relative to initial point or surface for control of the graphical user interface of a computer.

Working surface is an external solid or semi solid surface that allows sliding physical objects across.

Computer mouse for working surface is a computer mouse that is designed for sliding across various working surfaces and detecting motion relative to those surfaces.

Tip is the extreme end of something, especially when pointed having dimensions considerably smaller than the containing object, e.g. the sharp end of a pen.

Tip mechanism is mechanism for moving tip or set of tips.

Figure 1:
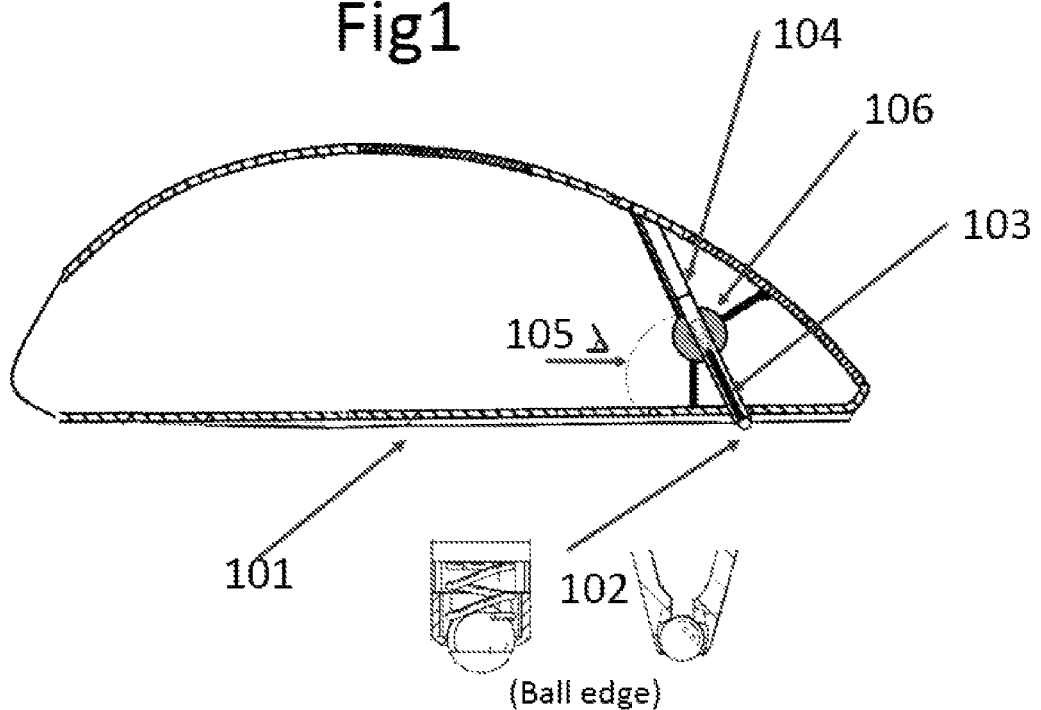
FIG. 1 is a longitudinal sectional view of computer mouse with movable rod shaft.

FIG. 1 shows the longitudinal sectional view of computer mouse with bottom surface resistance point. 101 is mouse base, lower part of it is sliding across work surface. 102 is an example of a ball tip that is located on the edge of movable rod shaft 103. The mouse base 101 has a hollow housing unit 207 which is in the form of a barrel 104. The barrel 104 is cylinder ending up at front part of base lower part. It may have steps inside. Movable rod shaft 103 is inside barrel, spring can be located between ball tip 102 and movable rod shaft 103 or between movable rod shaft 103 and barrel 104. Angle 105 between Steering axle of barrel 104 and base 101 can vary between 30 and 90 degrees. Button 106 is located on the side of mouse body in front of thumb or little finger, when hand is holding mouse. Side movement of those fingers are activating mechanism. Button mechanism may include locking mechanism by pressing or turning/sliding. Mechanical mechanism transmitting movement of rod button to movement of movable rod shaft 103 that cause ball tip 102 movement out of base 101 to work position. Releasing button 106 cause backward movement of 103 and movement of ball tip 102 back into the base 101 to retrieve position. Ball tip 102 in working position is creating working surface resistance, when mouse is sliding over work surface that enables user to make precise movement, fine tune positioning of mouse.

Figure 2:
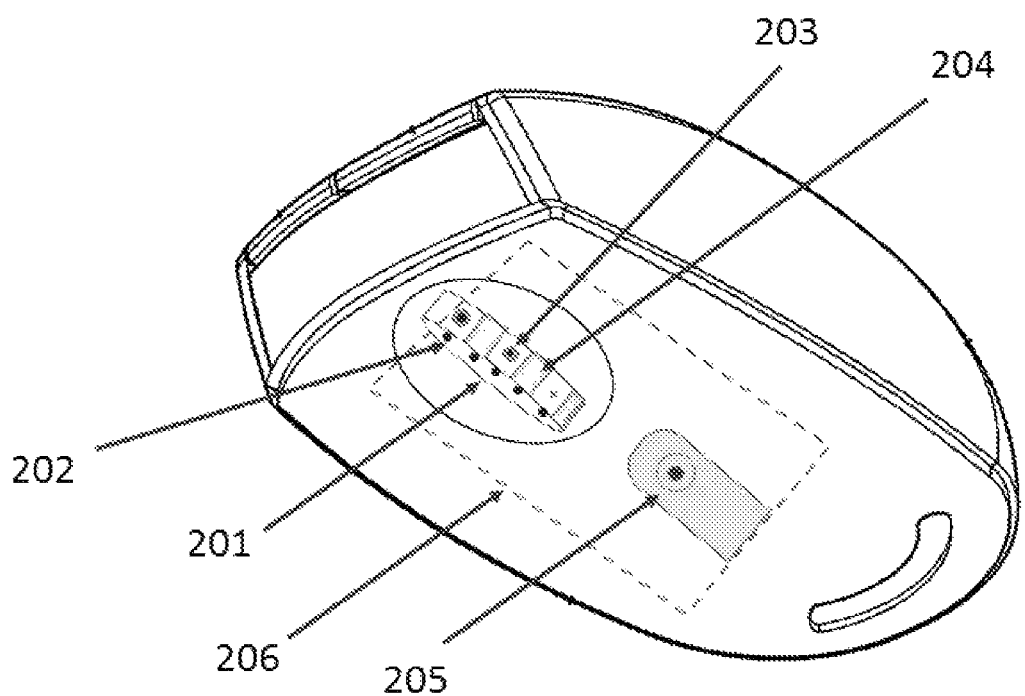
FIG. 2 is bottom view of computer mouse with wheel contained different tips.

FIG. 2 shows another embodiment of computer mouse with bottom surface resistance point. The mouse base 101 has a hollow housing unit 207 which is in the form of a rotating wheel 201 located on front part of the mouse bottom. Cavities 202 are located on side of wheel 201, used for fixing wheel 201 at specific position, using rod with spring that is sliding at side surface of wheel 201. Tips 203 of different size and shape are located on the bottom wheel. Tips are sticking out of mouse bottom by different height. Between tips 203 there are cavities 204 of different depth. At the opposite side to tip 203 on wheel 201, there are cavity 204 with depth correspondent to tip 203 height. Optical sensor 205 is located on its base plate 206, which is pressed (by springs) against wheel 201. Turning wheel 201 in certain position with one of tip 203 at the bottom, mouse is raised over bottom surface, optical sensor plate 206 and optical sensor 205 is lowered to keep same distance between optical sensor 205 and bottom surface. One or more positions of wheel 201 does not have nether tip 203 nor cavity 204 on opposite side.

Figure 3:
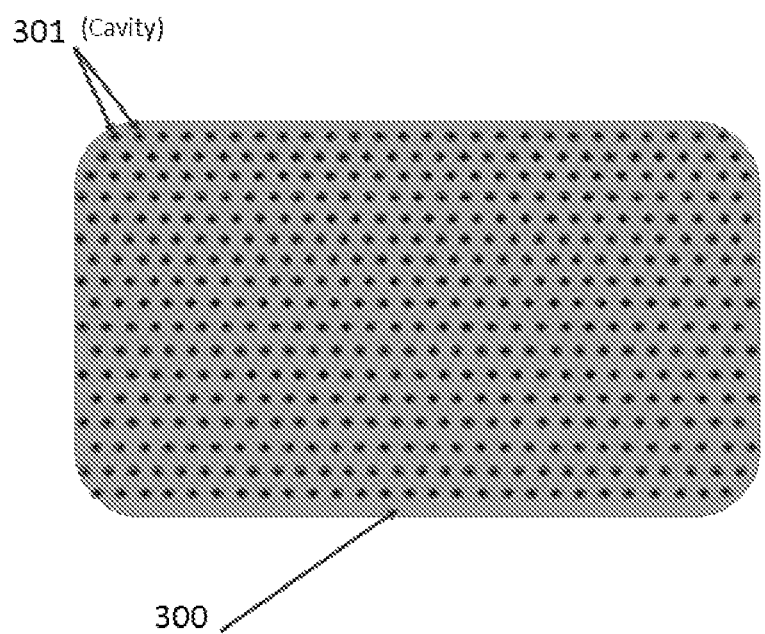
FIG. 3 is view of mouse pad for grid snap.

FIG. 3 shows mouse pad 300. Cavities 301 in form of grid together with tip in working position-providing ability to locate cursor to certain positions on computer screen with greater precision and or speed. Set of cavities is forming grid. Form and dimensions of cavities is correspondent to form and dimensions of tip, so for ball tip cavities are in form of cone. If angle between rod and mouse base is less than 90 degrees, slope of cavity cone should be lower, than slope for 90-degree rod.

Figure 4:
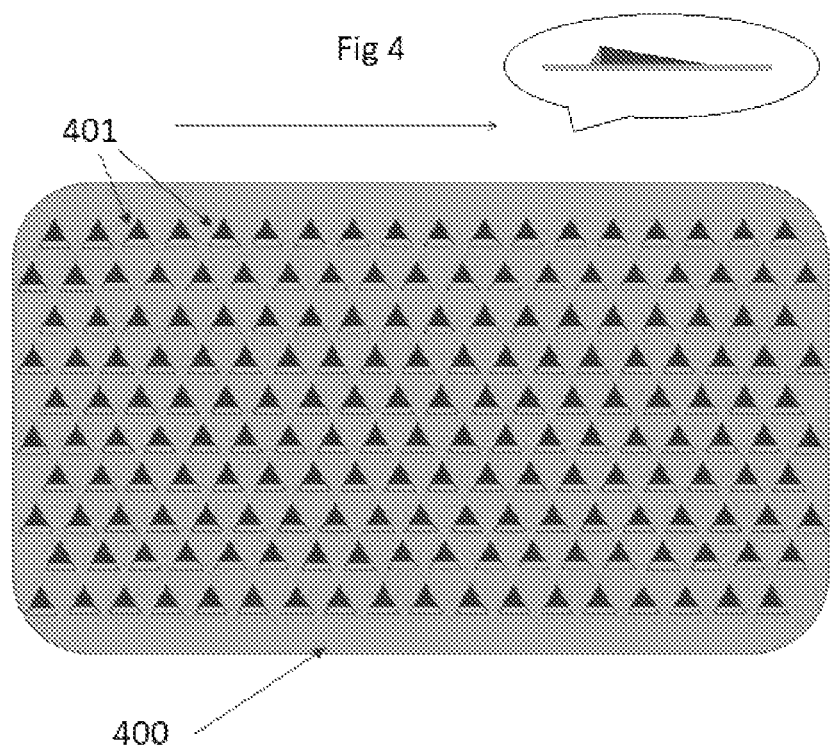
FIG. 4 is view of mouse pad with directional resistance in grid pattern.

FIG. 4 shows mouse pad 400. Projections 401 are projections with triangular form. Set of projections are forming grid pattern, while projection height is changing from maximum to zero in certain direction (upwards in current example), proving together with tip located at computer mouse bottom maximum resistance for computer mouse moving in this direction. Moving computer mouse with tip in working position upwards will create maximum resistance, while moving downwards will create minimum resistance.

Figure 5:
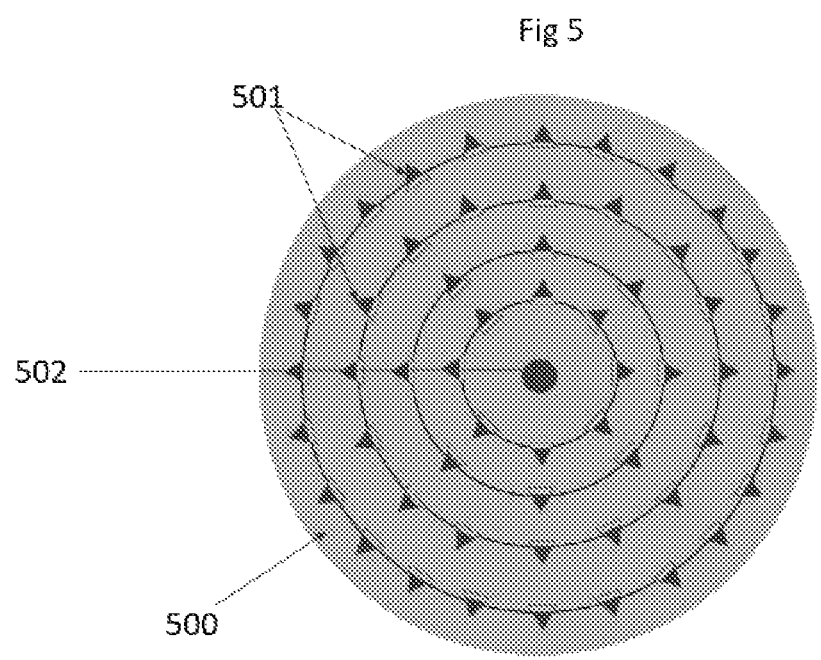
FIG. 5 is view of mouse pad with directional resistance in circle pattern.

FIG. 5 shows mouse pad 500. Projections 501 are projections with triangular form. Set of projections are forming a circle pattern, while projection height is changing from maximum to zero in certain direction (outwards in current example). Moving computer mouse with tip in working position outwards from center (502) will create maximum resistance, while moving to the center will create minimum resistance.

Figure 6:
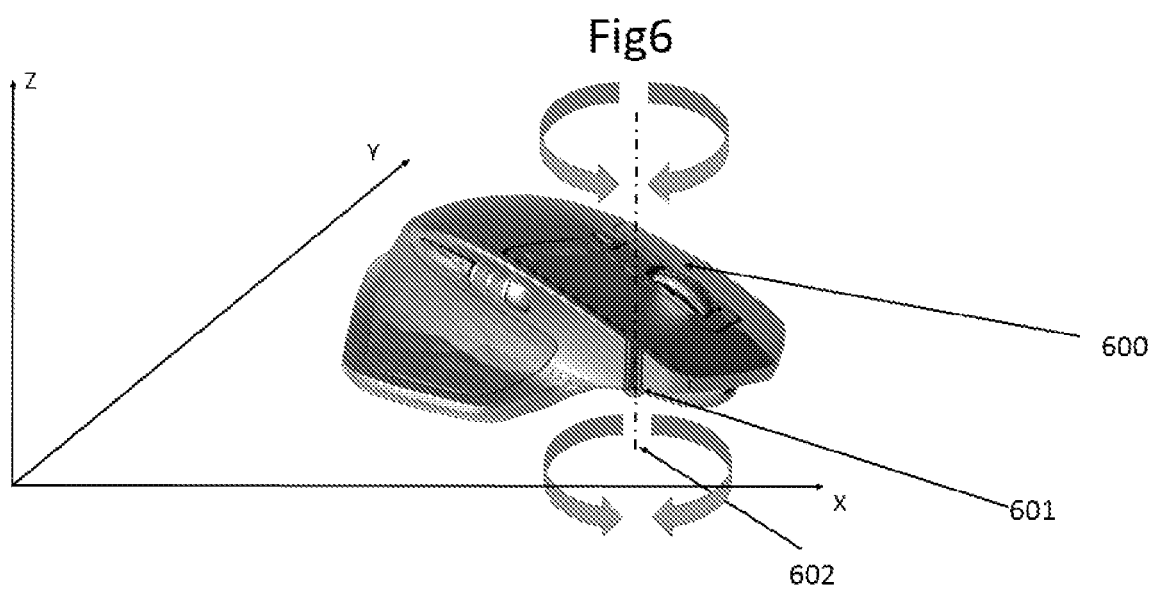
FIG. 6 is example of mouse rotational gesture.

FIG. 6 shows computer mouse 600. When tip 601 is moved to braked position, the user can perform rotational movements/gestures around axis 602. Rotational movements/gestures can be in the same direction or opposite direction or interchangeably.

FIG. 7 shows computer mouse 700. A hall effect pressure sensor 702, When tip 701 is moved to braked position, the user can perform pressure gestures by pressuring mouse body against the working surface. When tip 701 is pressed against the working surface, same pressure is applied to pressure sensor 702 on the other side of the rod shaft, while sensor 702 is sending signal proportional to the exposed pressure.

The invention claimed is:

1. A computer mouse for working surfaces, the computer mouse comprising:
   a base with a bottom surface configured for sliding across the working surface;
   a hollow housing unit extending from the bottom surface, the hollow housing unit comprising a tip, or a set of a plurality of tips, the tips being of varying size and shape, and the tip having a retrievable tip mechanism for providing a resistance point during mouse movement over the working surface for providing precision movements by sticking the tip out of the bottom surface of the computer mouse in varying heights; and
   a movement detection sensor for measuring the computer mouse movement over the working surface and navigating a pointer to different directions,
   where at a retrieved position of the retrievable tip mechanism, the tip is not touching the working surface, providing regular mouse movement,
   while at a working position of the retrievable tip mechanism, the tip is touching the work surface and creating resistance while using hand pressure on the computer mouse for precise movement of the computer mouse over the work surface,
   characterized in that the tip and its height have no effect on the position and navigation of the pointer on a computer screen.

2. The computer mouse for working surfaces of claim 1, wherein the retrievable tip mechanism is configured to keep constant distance between the working surface and the movement detection sensor, while the tip is moved to the working position.

3. The computer mouse for working surfaces of claim 1, wherein the computer mouse further comprising:
   a button for switching between retrieved and working positions,
   wherein a user uses the button to switch between retrieved and working positions preemptively or during mouse movement.

4. The computer mouse for working surfaces of claim 1, wherein the hollow housing unit including a movable rod shaft, penetrating the base, wherein a steering axle of the movable rod shaft is at a predefined angle to the base.

5. The computer mouse for working surfaces of claim 4, wherein the movable rod shaft including a locking mechanism for holding the tips at specific penetration.

6. The computer mouse for working surfaces of claim 1, wherein the hollow housing unit including a rotating wheel having one or more tips fixed at certain positions.

7. The computer mouse for working surfaces of claim 4, wherein the retrievable tip mechanism has a braking position, creating a braking effect to mouse movement.

8. The computer mouse for working surfaces of claim 7, wherein the retrievable tip mechanism including an electrical actuator for moving the movable rod shaft between the retrieved position, working position, and braking positions.

9. The computer mouse for working surfaces of claim 8, wherein the electrical actuator is activated or deactivated by a computer program receiving signals from the movement detection sensor identifying forward, backward, sideward or to other direction movements of the computer mouse upon pre-selection by the user.

10. The computer mouse for working surfaces of claim 8, wherein the electrical actuator is activated or deactivated by a computer program receiving signals from the movement detection sensor identifying if the computer mouse is decelerating or accelerating or moving with a constant speed.

11. The computer mouse for working surfaces of claim 8, wherein the electrical actuator is activated or deactivated by a computer program, based on position and/or distance of virtual objects in a computer software relative to the pointer.

12. The computer mouse for working surfaces of claim 1, wherein the computer mouse further comprising:
   a mouse pad having a set of separated cavities forming a pattern, providing together with the tip the ability to locate the pointer to certain positions on a computer screen with greater precision and/or speed by stopping the tip at a specific cavity based on the formed pattern.

13. The computer mouse for working surfaces of claim 12, wherein depth, form and dimensions of the cavities are correspondent to form and dimensions of the tip and an angle between the tip and the mouse base.

14. The computer mouse for working surfaces of claim 12, wherein depth of the cavities changes from maximum to zero in a certain direction creating minimum resistance for the computer mouse with the tip in the working position in this direction.

15. The computer mouse for working surfaces of claim 1, wherein the computer mouse further comprising:
a mouse pad having a set of separated projections forming a pattern, providing together with the tip increased resistance in certain directions on the given pattern as the tip is placed on a specific projection.

16. The computer mouse for working surfaces of claim 15, wherein height of the projections changes from maximum to zero in a certain direction creating different resistance for the computer mouse with the tip in working position in this direction.

17. A method for increasing movement precision of a computer mouse for working surfaces having
a base with a bottom surface configured for sliding across the working surfaces, a hollow housing unit extending from the bottom surface,
the hollow housing unit comprising a tip, or a set of a plurality of tips, the tips being of varying size and shape,
the tips having a retrievable tip mechanism for providing a resistance point during mouse movement over the working surface for providing precision movements by sticking the tip out of the bottom surface of the computer mouse in varying heights, and a movement detection sensor for measuring the computer mouse movement over the working surface, wherein the tip and its height have no effect on the position and navigation of the pointer on a computer screen,
the method comprising:
providing hand pressure on the computer mouse;
measuring movement of the computer mouse over the working surface using the movement detection sensor; and
penetrating the tip to touch the working surface and creating resistance at specific penetration while using the hand pressure on the computer mouse if precise movement of the computer mouse over the working surface is required,
else providing regular mouse movement of the computer mouse by causing the tip not to touch the working surface, wherein during the precise movement of the computer mouse over the working surface, causing the tip to stick out of the bottom surface of the computer mouse at specific height for providing a resistance point and increasing or decreasing resistance for precise movement and/or creating braking effect of the computer mouse over the working surface.

18. The method of claim 17, wherein the method comprising using rotational movement of the computer mouse around an axis provided by the tip for increasing precision and/or registering a rotational gesture by a computer program.

19. The method of claim 17, wherein the method further comprising detecting a pressure on the mouse tip through a pressure detection sensor; and using the hand pressure on the computer mouse to create a pressure on the mouse tip while the tip is in working position where the pressure detection sensor detects such pressure for registering a pressure gesture by a computer program.

20. The method of claim 17, wherein the method further comprising placing the computer mouse on a sloped surface, where tip resistance and/or braking effect reduces sliding on the sloped surface.

* * * * *